(12) United States Patent
Nakkash et al.

(10) Patent No.: US 12,434,638 B2
(45) Date of Patent: Oct. 7, 2025

(54) VEHICLE INTERIOR PANEL WITH ONE OR MORE DAMPING PADS

(71) Applicants: Gary H Nakkash, West Bloomfield, MI (US); Mark Sanders, Davisburg, MI (US); Sarah Oliver, Clawson, MI (US); Matthew Maranzano, Shelby Township, MI (US); Wesley Dietrich, Bloomfield Hills, MI (US); Sneha Rampa, Lake Orion, MI (US)

(72) Inventors: Gary H Nakkash, West Bloomfield, MI (US); Mark Sanders, Davisburg, MI (US); Sarah Oliver, Clawson, MI (US); Matthew Maranzano, Shelby Township, MI (US); Wesley Dietrich, Bloomfield Hills, MI (US); Sneha Rampa, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 118 days.

(21) Appl. No.: 17/825,171

(22) Filed: May 26, 2022

(65) Prior Publication Data
US 2023/0382318 A1    Nov. 30, 2023

(51) Int. Cl.
*B60R 13/08* (2006.01)
*B60R 13/02* (2006.01)

(52) U.S. Cl.
CPC ...... *B60R 13/0815* (2013.01); *B60R 13/0225* (2013.01)

(58) Field of Classification Search
CPC .................. B60R 13/0815; B60R 13/0225
See application file for complete search history.

(56) References Cited

U.S. PATENT DOCUMENTS

| | | | | |
|---|---|---|---|---|
| 4,495,731 A * | 1/1985 | Sears | ...................... | B60J 7/1642 49/505 |
| 4,741,945 A * | 5/1988 | Brant | ...................... | B60R 13/02 296/214 |
| 4,851,274 A * | 7/1989 | D'Elia | ...................... | D04H 1/48 428/113 |
| 5,280,991 A * | 1/1994 | Weiland | .............. | B60R 13/0231 296/214 |
| 5,308,678 A * | 5/1994 | Tsujimura | ................. | B32B 5/18 156/196 |
| 5,660,908 A * | 8/1997 | Kelman | .................... | B32B 3/30 428/167 |
| 6,896,321 B2 | 5/2005 | Vishey et al. | | |
| 7,918,313 B2 * | 4/2011 | Gross | ................... | D04H 1/5418 181/294 |
| 8,931,592 B2 * | 1/2015 | Savian | ...................... | B64C 1/40 244/119 |

(Continued)

*Primary Examiner* — Paul N Dickson
*Assistant Examiner* — Sara Laghlam
(74) *Attorney, Agent, or Firm* — Jeremy J. Klobucar

(57) ABSTRACT

In at least some implementations, a panel for a vehicle includes a base having an interior surface and an exterior surface, and at least one damping pad having a first surface secured to the exterior surface of the base and a second surface opposite to the first surface. The at least one damping pad has a thickness measured between the first surface and the second surface, and the thickness of the at least one damping pad in an uncompressed state prior to installation into the vehicle is at least 5% greater than a thickness of the at least one damping pad in a compressed state when installed into the vehicle.

14 Claims, 3 Drawing Sheets

(56) References Cited

U.S. PATENT DOCUMENTS

| | | | |
|---|---|---|---|
| 9,051,014 B2* | 6/2015 | Lookebill | B32B 5/02 |
| 9,586,380 B2* | 3/2017 | Burgin | B32B 27/02 |
| 9,630,576 B1* | 4/2017 | Stebbins | B60R 13/0815 |
| 10,329,194 B2* | 6/2019 | Barthelat | C03C 17/322 |
| 11,220,226 B2* | 1/2022 | Forgette | B60R 13/0225 |
| 2006/0103172 A1 | 5/2006 | Veen et al. | |
| 2008/0166508 A1* | 7/2008 | Edwards | B29C 44/3411 |
| | | | 264/339 |

* cited by examiner

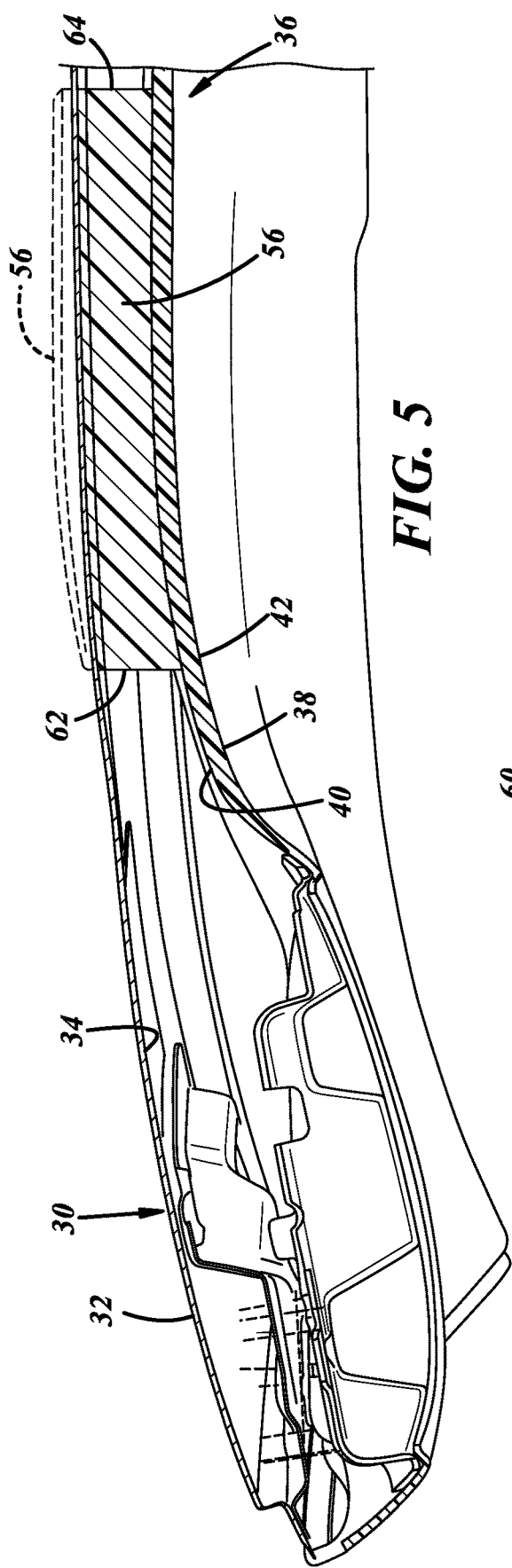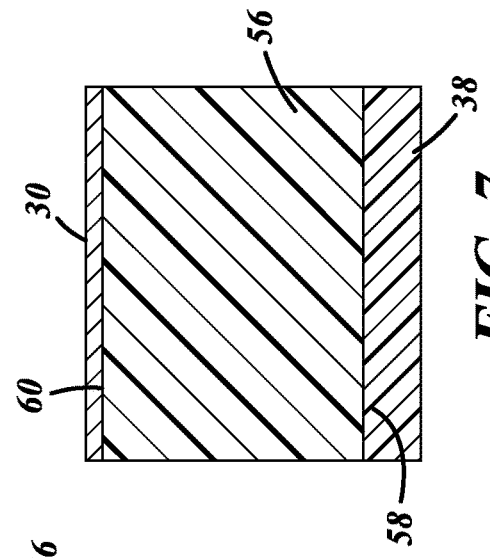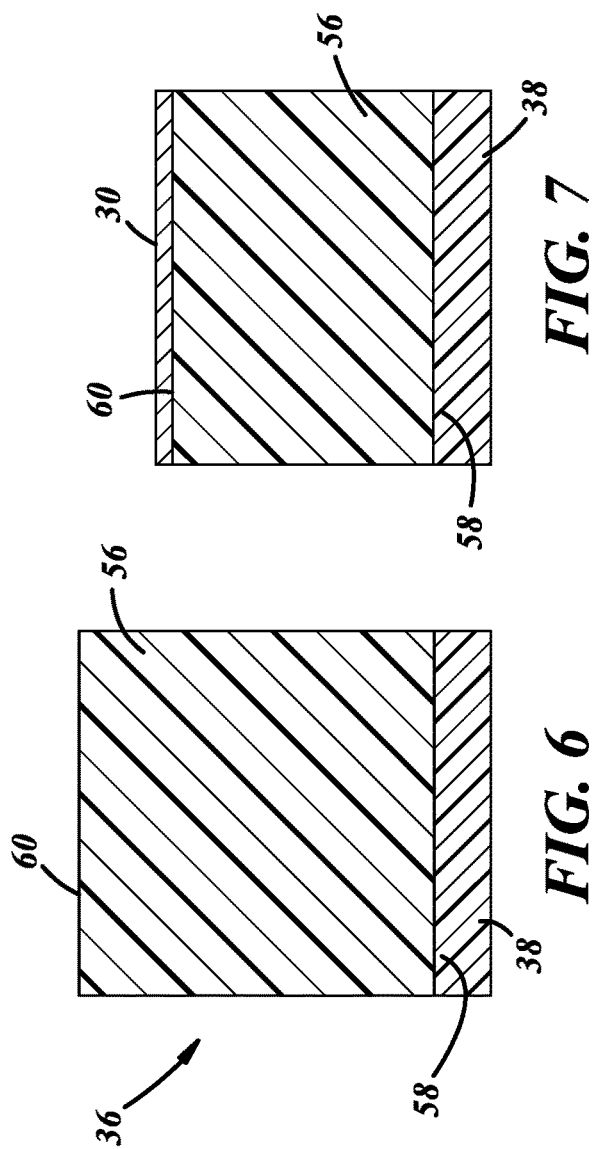

VEHICLE INTERIOR PANEL WITH ONE OR MORE DAMPING PADS

FIELD

The present disclosure relates to a vehicle interior panel with one or more damping pads.

BACKGROUND

Some vehicles include a metal roof panel supported by roof rails and structural supports of the vehicle. The roof panels may be large and subject to deflection and vibration, and can cause and transmit undesirable noise and vibrations in the vehicle. Some such vehicles include a headliner and uncompressed materials between the headline and roof, of differing materials to attempt to attenuate vibrations at different frequencies. The uncompressed materials do not fill a cavity between the roof panel and headliner, are separately installed into the vehicle relative to other materials and the headliner, increase assembly time, cost and complexity, and increase vehicle weight.

SUMMARY

In at least some implementations, a panel for a vehicle includes a base having an interior surface and an exterior surface, and at least one damping pad having a first surface secured to the exterior surface of the base and a second surface opposite to the first surface. The at least one damping pad has a thickness measured between the first surface and the second surface, and the thickness of the at least one damping pad in an uncompressed state prior to installation into the vehicle is at least 5% greater than a thickness of the at least one damping pad in a compressed state when installed into the vehicle.

In at least some implementations, the base has opposed, fore-aft extending side edges, a cross-car extending front edge and a cross-car extending rear edge, and wherein the at least one damping pad is arranged spaced from the side edges and the front edge and the rear edge. In at least some implementations, the at least one damping pad extends greater than 50% of the distance between the side edges.

In at least some implementations, the at least one damping pad includes multiple damping pads that are spaced apart from each other. The multiple damping pads may include at least three damping pads that are spaced apart from each other in a fore-aft direction.

In at least some implementations, the at least one damping pad may cover at least 25% of the surface area of the exterior surface. The at least one damping pad may be formed from a porous polymeric material including interconnected fibers. In at least some implementations, the at least one damping pad may have a thickness in the uncompressed state of between 30 mm and 60 mm, and a thickness in the compressed state of between about 28.5 mm and 57 mm.

In at least some implementations, a vehicle includes a frame including roof rails and a roof panel over the roof rails and defining an exterior surface of the vehicle, and an interior panel received adjacent to an opposite side of the roof rails from the roof panel. The interior panel has a base with an interior surface that defines part of a passenger compartment of the vehicle and an exterior surface facing the roof panel, and the interior panel includes multiple damping pads having a first surface secured to the exterior surface of the base and a second surface opposite to the first surface. The damping pads have a thickness measured between the first surface and the second surface, and the thickness of the damping pads in an uncompressed state, prior to installation of the interior panel into the vehicle, is at least 5% greater than a distance between the exterior surface and the roof panel such that the damping pads engage the roof panel and are compressed between the base and the roof panel. In at least some implementations, the pads are compressed between 5% and 60%, with some implementations of pads being compressed between 5% and 25%.

In at least some implementations, the base has opposed, fore-aft extending side edges, a cross-car extending front edge and a cross-car extending rear edge, and wherein the damping pads are arranged spaced from the side edges and the front edge and the rear edge. In at least some implementations, at least one of the damping pads extends greater than 50% of the distance between the side edges.

In at least some implementations, the frame includes two roof rails that extend in a fore-aft direction between front and rear ends of the frame, and the frame includes supports extending in a cross-car direction between the two roof rails, and wherein the damping pads are spaced apart from each other and at least two damping pads are located on opposed sides of one of said supports. In at least some implementations, at least three of the damping pads are spaced apart from each other in a fore-aft direction. In at least some implementations, the supports do not engage the second surface of the damping pads.

In at least some implementations, the damping pads may cover at least 25% of the surface area of the exterior surface. In at least some implementations, the damping pads are formed from a porous polymeric material including interconnected fibers. The damping pads may have a thickness in the uncompressed state of between 30 mm and 60 mm, and a thickness in the compressed state of between about 28.5 mm and 57 mm.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 5 is an enlarged, fragmentary, side sectional view showing a portion of the components in FIG. 4

FIG. 6 is a diagrammatic view showing the interior panel with a damping pad in an uncompressed state; and FIG. 7 is a diagrammatic view showing the interior panel with a damping pad in a compressed state against the roof panel.

DETAILED DESCRIPTION

Figure 1:
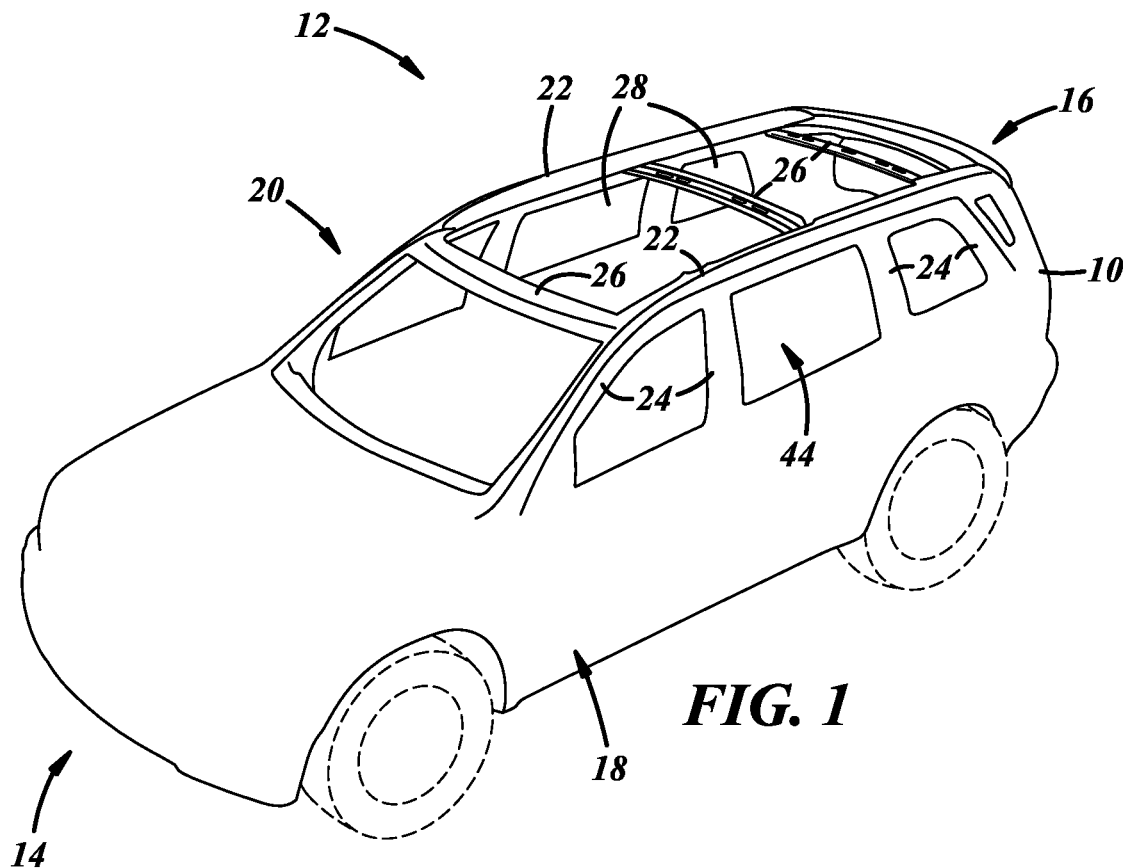
FIG. 1 is a perspective view of a portion of a vehicle including a frame without a roof panel or an interior panel.

Referring in more detail to the drawings, FIG. 1 shows part of a body and frame 10 for a vehicle 12 having a front end 14, a rear end 16, and left and right sides 18, 20. The front and rear ends 14, 16 are spaced apart in a fore-aft direction and the left and right sides 18, 20 are spaced apart in a cross-car direction. The frame 10 includes multiple interconnected structural members upon which for example, powertrain and suspension components, and exterior panels and interior trim components are mounted or otherwise supported.

Figure 2:
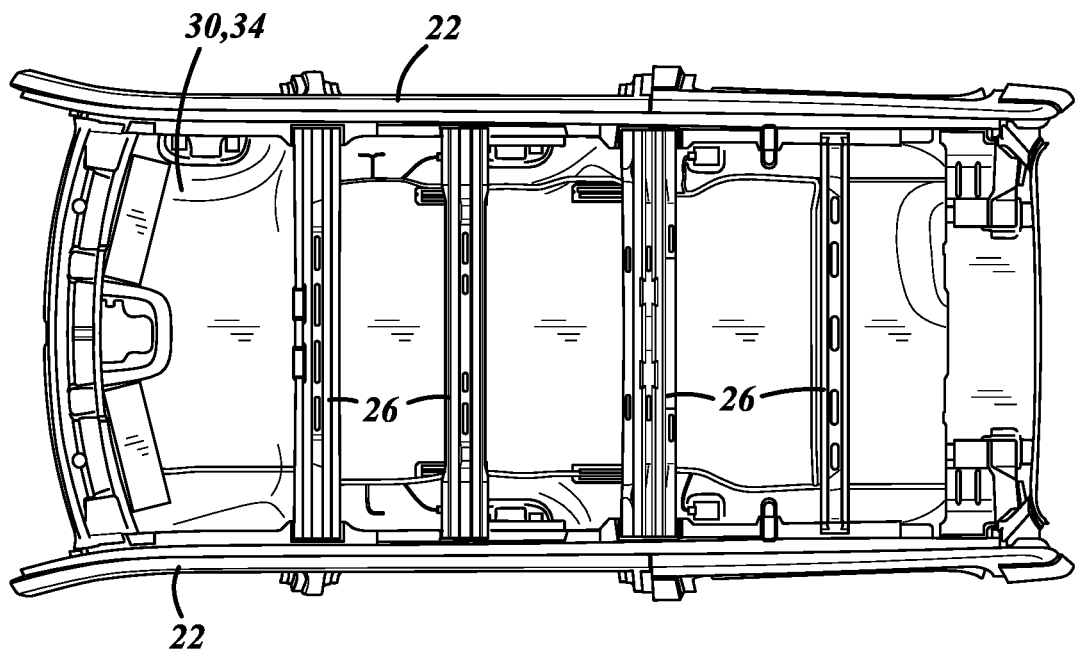
FIG. 2 is a bottom view of a portion of the vehicle showing roof rails, roof supports and a roof panel.

As shown in FIGS. 1 and 2, the frame 10 includes two roof rails 22 that extend in the fore-aft direction and which are connected to pillars 24 extending along the vehicle sides (often referred to as A, B, C and/or D pillars). Multiple roof supports 26 may be coupled to the roof rails 22 and extend in the cross-car direction between the roof rails 22. The roof supports 26 may be spaced apart from each other in the fore-aft direction defining open spaces 28 between the roof rails 22 and roof supports 26.

Figure 4:
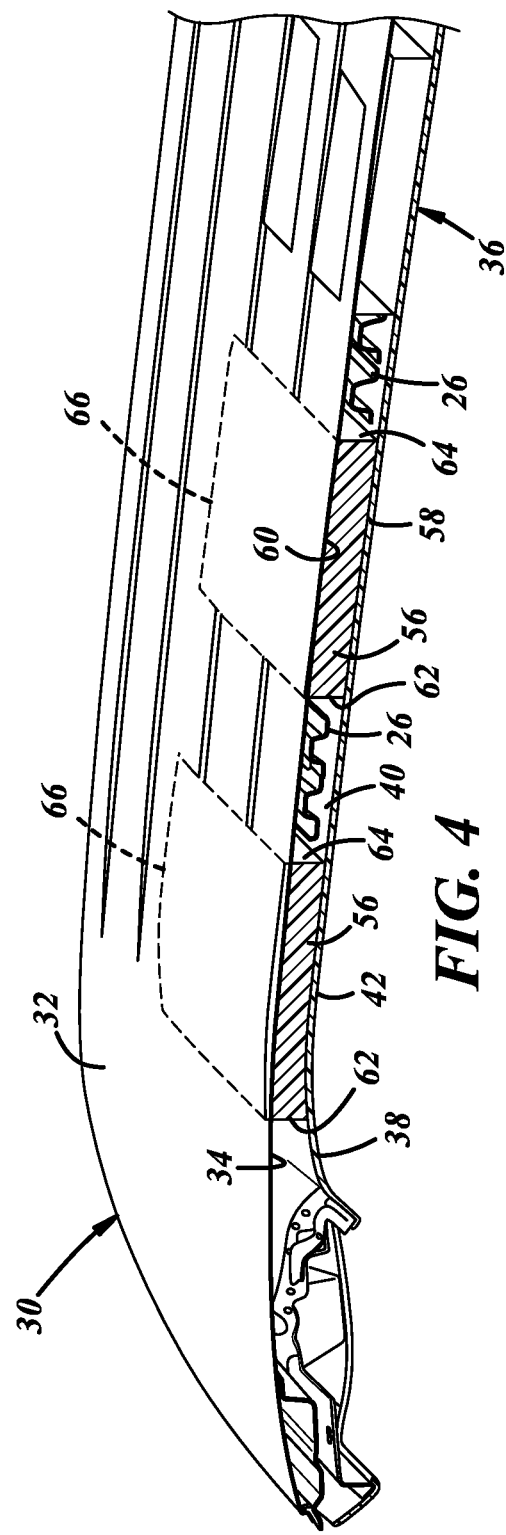
FIG. 4 is a fragmentary perspective sectional view showing the roof panel and interior panel in an assembled position.

As shown in FIG. 2, a roof panel 30 may be received over the roof rails 22 and roof supports 26. The roof panel 30 may have an exterior surface 32 (shown in FIGS. 4 and 5) that defines part of an exterior of the vehicle 12 and an interior surface 34 that is opposite to the exterior surface 32 and which faces toward the roof rails 22 and/or roof supports 26. In at least some implementations, a single roof panel 30 overlaps both roof rails 22 and each of the roof supports 26.

As shown in FIGS. 3-6, an interior panel 36, sometimes called a headliner, may cover some or all of the roof rails 22 and roof supports 26. The interior panel 36 includes a base 38 having an exterior surface 40 adjacent and facing the roof supports 26, and an interior surface 42 that defines part of a passenger compartment 44 (FIG. 1) of the vehicle 12 in which vehicle occupants are received in use of the vehicle. The interior panel 36 may include connectors 46 arranged to be connected to vehicle structures so that the panel 36 remains adjacent to the roof supports 26 and roof rails 22. Such connectors 46 may be on the exterior surface 40 of the base 38, if desired, so that the connectors 46 are not visible to occupants within the passenger compartment 44. The interior surface 42 of the panel base 38 may include or be coupled to a cover, which may be of any desired material, such as a thin fabric layer. The base 38 has opposite side edges 48, 50 spaced apart in the cross-car direction and arranged in the fore-aft direction, and opposite front and rear edges 52, 54 spaced apart in the fore-aft direction and arranged in the cross-car direction. The roof panel 30 and interior panel 36 may be continuous, that is, without openings between the edges, or one or both may include openings for various vehicle features, like storage compartments, HVAC vents, sunroofs, etc.

In at least some implementations, the interior panel 36 also includes at least one damping pad 56 located between the exterior surface 40 of the interior panel 36 and the interior surface 34 of the roof panel 30. In at least some implementations, multiple damping pads 56 are provided on the interior panel 36. The remainder of this description will focus on implementations having multiple damping pads 56, although modifications and implementations having a single damping pad are also contemplated, discussed below and may be used. In at least some implementations, the multiple damping pads 56 include at least three damping pads 56 that are spaced apart from each other in a fore-aft direction. That is, the pads may include forward and rearward edges 62, 64 that are spaced apart from edges of adjacent pads. The pads 56 may be spaced apart sufficiently to receive a roof support 26 between them (e.g a roof panel between the forward edge 62 of one pad 56 and the rearward edge 64 of an adjacent pad 56), without engaging the roof support 26, or with some or full engagement of a roof support 26 on one or more pads 56, as desired. In at least some implementations, the pads 56 are polygonal and may be rectangular, as shown in the drawings. Of course, any shape may be used, as desired.

In at least some implementations, a first surface 58 each damping pad 56 is secured to the exterior surface 40 of the base 38 and each damping pad 56 has a second surface 60 opposite to the first surface 58. A thickness of each damping pad 56 is measured between the first surface 58 and the second surface 60. In at least some implementations, the thickness of each damping pad 56 in an uncompressed state prior to installation into the vehicle is at least 5% greater than the thickness of each pad 56 in a compressed state when the panel is installed into the vehicle. The pads 56 have an uncompressed thickness that is greater than the distance between the exterior surface 40 of the base 38 of the interior panel 36 and the interior surface 34 of the roof panel 30. In at least some implementations, the pads are compressed between 5% and 60%, with some implementations of pads being compressed between 5% and 25%.

While not necessary, one or more pads 56 or a portion of one or more pads 56 may be received between a roof support 26 and the interior panel 36. In such a case, the uncompressed thickness of a pad 56 or portion thereof that engages a roof support 26, is greater than the distance between the roof support 26 and the exterior surface of the base 38 of the interior panel 36. For example, a single pad could extend from a space between adjacent roof supports 26 and under a roof support 26, up to extending under each of the roof supports 26 (e.g. a larger pad spanning the supports 26). The portions of a pad aligned with/overlapped by the supports 26 may be thinner than portions of the pad spaced from the supports 26, if desired, to, for example, provide a more uniform compression of the pad among portions compressed by the roof panel and portions compressed by a roof support.

So constructed and arranged, when the interior panel 36 is installed into the vehicle, the damping pad 56 or pads 56 are compressed between the base 38 and the roof panel 30. The amount of compression may be varied at different damping pads 56 or different portions of a damping pad 56, to provide a desired reduction in vibration or noise transmission by or between the roof panel 30 and the interior panel 36. In at least some implementations, each damping pad 56 has the same thickness in the uncompressed state. While described as being connected to the base 38 of the interior panel 36, the damping pads 56 could be connected to the roof panel 30, and engaged and compressed by the interior panel 36 when the interior panel 36 is assembled into the vehicle. In at least some implementations, the interior panel 36 may be formed of a polymeric material and the damping pads 56 may be formed of a polymeric material that is molded onto the base 38, bonded to the base 38 when the base 38 is formed, or attached to the base 38 after both the base 38 and damping pads 56 are separately formed, such as by an adhesive.

Figure 3:
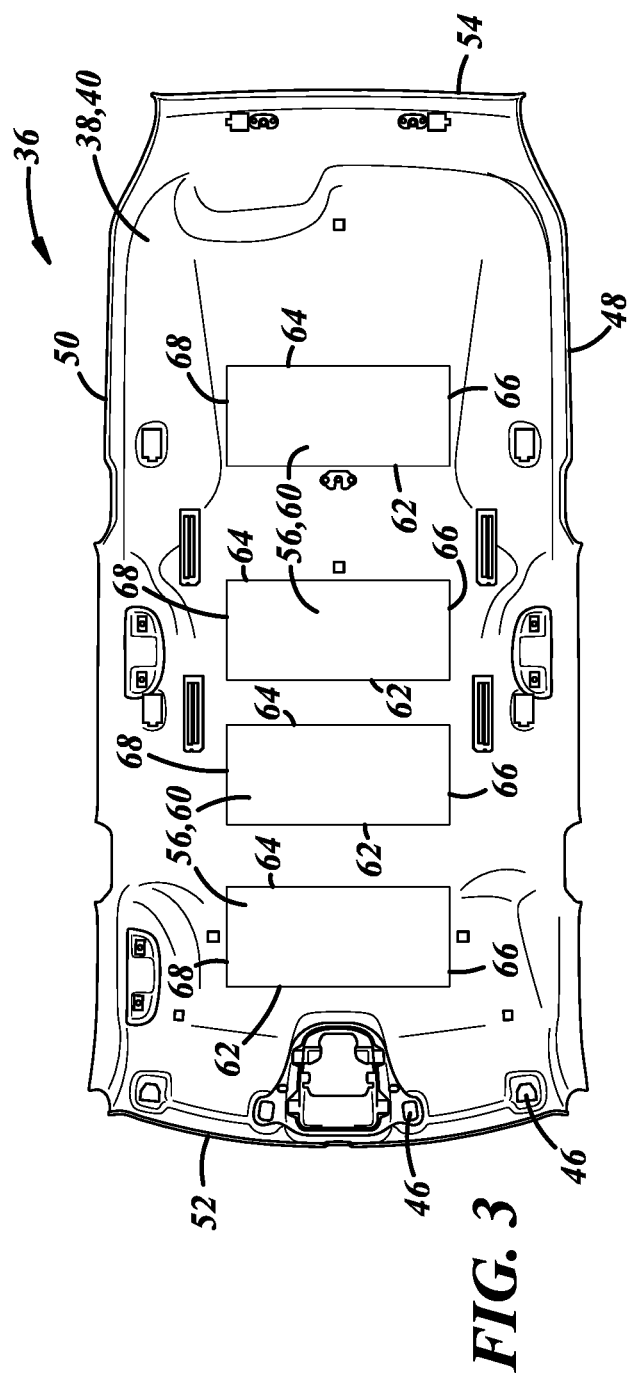
FIG. 3 is a top view of an interior panel of the vehicle.

In more detail, and referring to FIG. 3, one or more damping pads 56 are arranged with side edges 66, 68 of the pad(s) 56 spaced from the side edges 48, 50 of the base, and the front and rear edges 62, 64 of the pads may be spaced from the front edge 52 and the rear edge 54 of the base 38. The damping pads 56 may engage portions of the roof panel 30 that are spaced from the roof rails 22 and roof supports 26. These portions of the roof panel 30 are less supported and more prone to vibrations and deflections that may cause undesirable noise or vibrations noticeable within the passenger compartment. In at least some implementations, the damping pads 56 extend greater than 50% of the distance between the side edges 48, 50, and the damping pads 56 may be centered between the side edges if desired. The damping pads 56 may have opposite side edges 62, 64 that are spaced from a roof rail 22 and/or may be spaced from a roof support 26. In at least some implementations, the one or more damping pads 56 collectively cover at least 25% of the surface area of the exterior surface 40 of the base 38, and in at least some implementations, the pad 56(s) may cover not more than 75% of the surface area of the exterior surface 40 of the base 38.

In at least some implementations, each damping pad 56 is formed from a polymeric material that may be porous and include interconnected fibers. A representative but not limiting example material is a polyethylene terephthalate (PET) material, with Polylex® being one example of a PET material that may be used. Of course, other materials may be used as desired. The pads may have a density and compressibility suitable for manual installation of the panel in to the vehicle, where compression of the pads do not require a force greater than desired for manual installation. In at least some implementations, each damping pad 56 has a thickness in the uncompressed state of between 30 mm and 60 mm, and a thickness in the compressed state of between 28.5 mm and 57 mm. FIG. 5 shows an assembled position of the interior panel 36, and the dashed lines shows the position of an upper portion, including the second surface 60 of the damping pad 56, in the uncompressed state of that pad 56. This visually shows the compression of the damping pad 56 that occurs upon installation of the interior panel 36 into the vehicle. FIGS. 6 and 7 are diagrammatic views that show the interior panel 36 in the uncompressed state prior to assembly of the interior panel in to the vehicle (FIG. 6) and in the compressed state with a damping pad compressed against a roof panel 30 (FIG. 7) after assembly in to the vehicle.

In use, the pads 56 are compressed between the roof panel 30 and the base 38 of the interior panel 36, and the resilient nature of the pads 56 provides a force between and on the roof panel 30 and base 38 to damp vibrations. The pads 56 also fill otherwise open space between the roof panel 30, roof supports 26 and base 38, to reduce air flow and noise transmission in such areas. The pads 56 may be designed to be effective against boom level (e.g. low level) frequency vibrations and noise and also against higher frequency vibrations and noise. Prior vehicles have used different dampers to account for vibrations and noise at different frequencies, including thicker adhesive material adhered to the interior surface of the roof panel 30 to damp lower frequency noise, and an interior panel 36 spaced from both the roof panel 30 and adhesive material to damp higher frequency noise and vibration. The multiple materials involve more time, labor and cost to manufacture and assemble into a vehicle, and can result in increased weight. Further, the pads 56, when integrated into/on the interior panel 36 may be positioned as desired and may be automatically compressed and effective to damp vibrations and noise when the interior panel 36 is installed into the vehicle. No other installation operation is necessary to both install the interior panel 36 and position and compress the damping pads 56.

What is claimed is:

1. A panel for a vehicle, comprising:
    a base having an interior surface and an exterior surface; and
    at least one damping pad having a first surface secured to the exterior surface of the base and a second surface opposite to the first surface, the second surface being uncovered and adapted to directly engage a roof of a vehicle when the panel is installed in the vehicle, the at least one damping pad having a thickness measured between the first surface and the second surface, and the thickness of the at least one damping pad in an uncompressed state prior to installation into the vehicle is at least 5% greater than a thickness of the at least one damping pad in a compressed state when installed into the vehicle, and wherein the at least one damping pad covers at least 25% of the surface area of the exterior surface, and wherein the at least one damping pad, including the first surface and the second surface, is formed from a material defined by interconnected polymeric fibers.

2. The panel of claim 1 wherein the base has opposed, fore-aft extending side edges, a cross-car extending front edge and a cross-car extending rear edge, and wherein the at least one damping pad is arranged spaced from the side edges and the front edge and the rear edge.

3. The panel of claim 2 wherein the at least one damping pad extends greater than 50% of the distance between the side edges.

4. The panel of claim 1 wherein the at least one damping pad includes multiple damping pads that are spaced apart from each other.

5. The panel of claim 1 wherein the at least one damping pad includes multiple damping pads and the combined surface area of the first surface of the multiple damping pads is equal to at least 25% of the surface area of the exterior surface.

6. The panel of claim 1 wherein the at least one damping pad is formed from polyethylene terephthalate.

7. The panel of claim 1 wherein the at least one damping pad has a thickness in the uncompressed state of between 30 mm and 60 mm, and a thickness in the compressed state of between 28.5 mm and 57 mm.

8. The panel of claim 4 wherein the multiple damping pads includes at least three damping pads that are spaced apart from each other in a fore-aft direction.

9. A vehicle, comprising:
    a frame including roof rails and a roof panel over the roof rails and defining an exterior surface of the vehicle, wherein the frame includes two roof rails that extend in a fore-aft direction between front and rear ends of the frame, and the frame includes supports extending in a cross-car direction between the two roof rails;
    an interior panel received adjacent to an opposite side of the roof rails from the roof panel, the interior panel has a base with an interior surface that defines part of a passenger compartment of the vehicle and an exterior surface facing the roof panel, and the interior panel includes multiple damping pads having a first surface secured to the exterior surface of the base and a second surface opposite to the first surface and engaged with the roof panel, the damping pads having a thickness measured between the first surface and the second surface, and the thickness of the damping pads in an uncompressed state, prior to installation of the interior panel into the vehicle, is at least 5% greater than a distance between the exterior surface and the roof panel such that the damping pads engage the roof panel and are compressed between the base and the roof panel, and wherein the damping pads are formed from a porous polymeric material including interconnected fibers, and said material defines the first surface and the second surface and is directly engaged with the roof panel, and wherein the damping pads are spaced apart from each other and at least two damping pads are located on opposed sides of one of said supports, and wherein the roof rails and the supports do not engage the second surface of the damping pads.

10. The vehicle of claim 9 wherein the base has opposed, fore-aft extending side edges, a cross-car extending front edge and a cross-car extending rear edge, and wherein the damping pads are arranged spaced from the side edges and the front edge and the rear edge.

11. The vehicle of claim 10 wherein at least one of the damping pads extends greater than 50% of the distance between the side edges.

12. The vehicle of claim 9 wherein the damping pads cover at least 25% of the surface area of the exterior surface.

13. The vehicle of claim 9 wherein the damping pads have a thickness in the uncompressed state of between 30 mm and 60 mm, and a thickness in the compressed state of between 28 mm and 57 mm.

14. The vehicle of claim 9 wherein at least three of the damping pads are spaced apart from each other in a fore-aft direction.

* * * * *